Oct. 9, 1956  R. P. SKERRITT  2,765,587
PROCESS FOR MAKING FIBROUS GLASS SHEET
Filed Feb. 2, 1953  2 Sheets-Sheet 2

INVENTOR.
Roy P. Skerritt
BY Barthel & Bugbee
Attys.

United States Patent Office 2,765,587
Patented Oct. 9, 1956

2,765,587

PROCESS FOR MAKING FIBROUS GLASS SHEET

Roy P. Skerritt, Detroit, Mich., assignor to Economatic Products Company, Detroit, Mich., a corporation of Michigan Application February 2, 1953, Serial No. 334,427

3 Claims. (Cl. 49—77)

This invention relates to compressed porous plates made from fibrous glass and, in particular, to processes for making such plates.

One object of this invention is to provide a process for making fused compressed fibrous glass plates wherein the work of compressing the fibrous glass and the work of removing the fused plates from the oven is performed at or near room temperature rather than at the high fusing temperatures, so that it is unnecessary to use expensive alloy metals hitherto used in the equipment, and discomfort and danger in handling are eliminated.

Another object is to provide a process for making porous fibrous glass plates wherein compression of the fibrous glass bats is made prior to subjecting the compressed bats to high heat to fuse them into thinner plates than the bats before compression.

Another object is to provide a process for making fibrous glass plates from fibrous glass bats or blankets wherein the glass fibers have been previously treated with a liquid binder such as water or formaldehyde, the bats being compressed into the thickness of the eventual plates before fusing, the compressed bats or blankets being then inserted in a furnace and heated to a relatively low fusion temperature, the initial part of the heating driving off the binder as a volatile product and the latter part of the heating fusing the fibers into adhesion with one another.

Another object is to provide a process of making porous fibrous glass plates of the foregoing character wherein the fibrous glass bats or blankets are compressed vertically while stacked in horizontal layers, then clamped together in a compressed assembly, and the assembly placed on edge with the layers vertical while subjected to a high heat which volatilizes any binder which may be present on glass fibers and causes the fibers to become tacky and coalesce, the heat being applied relatively slowly in comparison with prior glass fiber heating processes.

Another object is to provide a process of making the partially translucent fibrous glass plate of the object immediately preceding, wherein pieces of transparent or translucent glass are pressed into the fibrous glass bats or blankets, after which the compressed bat or blanket containing the glass pieces if heated to a high heat to fuse the assembly into a relatively thin plate, in comparison with the thickness of the bat or blanket before compression.

Another object is to provide a process of making the partially translucent fibrous glass plate of the objects immediately preceding, wherein colored glass pieces are embedded in the fibrous glass bats or blankets and wherein the compressed bat or blanket containing the colored glass pieces is heated to a sufficiently high heat to fuse the assembly into a relatively thin plate, yet wherein the temperature of fusion is kept at a minimum to avoid deforming the glass pieces or removing the color therefrom.

Other objects and advantages of the invention will become apparent during the course of the following description of the accompanying drawings, wherein:

Figure 4 is a top plan view, on a reduced scale, of a finished porous fibrous glass sheet, after fusion but before separation into plates;

Figure 5 is a perspective view of one of the plates cut from the fused fibrous glass sheet shown in Figure 4;

Figure 1:
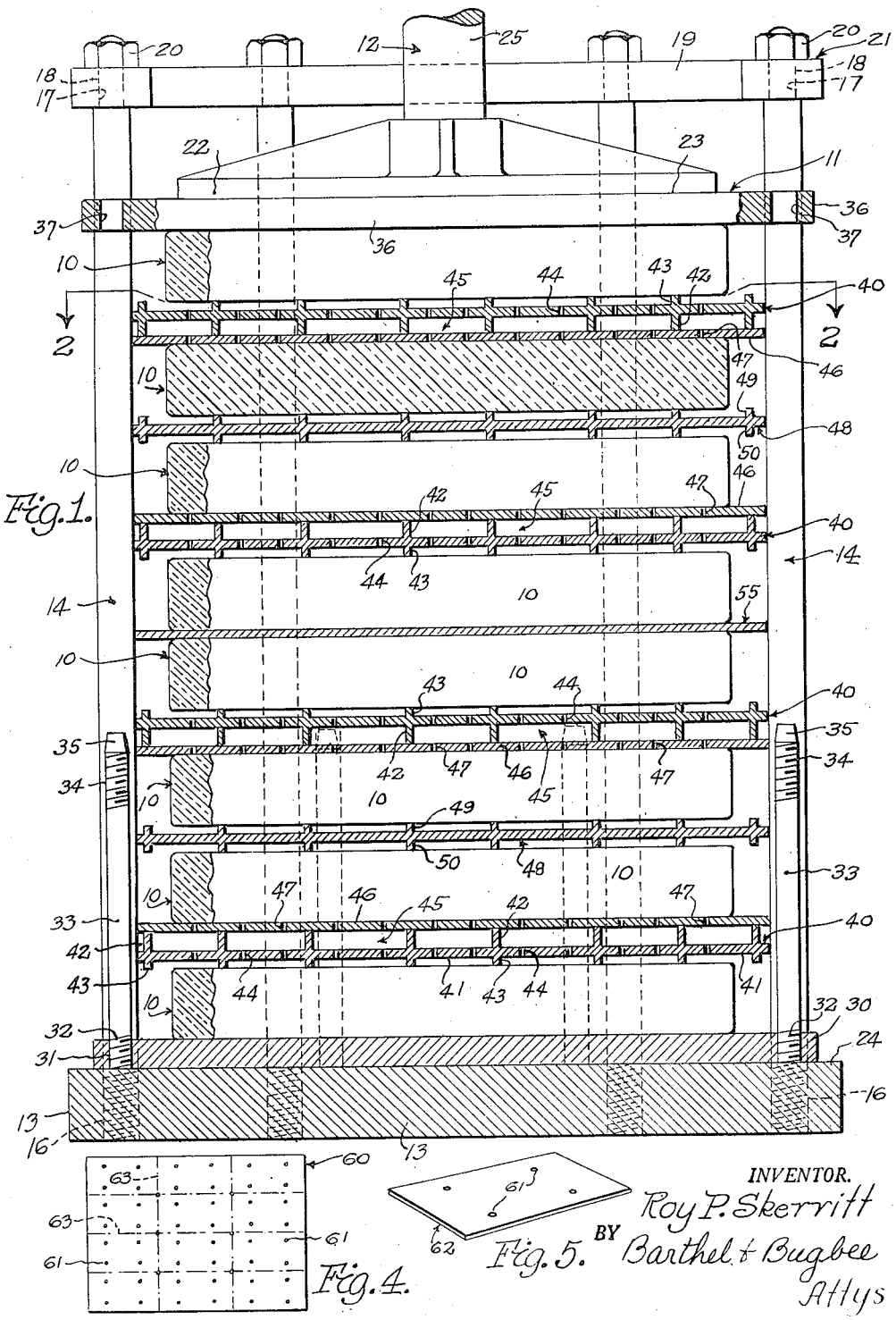
Figure 1 is a side elevation, partly in vertical section, of a machine for making the porous fibrous glass plates according to the invention, showing the fibrous glass bats or blankets in position prior to compression and clamping.

Referring to the drawings in detail, Figure 1 shows a stack of fibrous glass bats or blankets 10 arranged in a clamping holder, generally designated 11, which in turn is mounted in a press, generally designated 12, for compression into thinner plates or slabs prior to fusing in a furnace. The press 12 is conventional and its details are outside the scope of the present invention, as any suitable press may be used for the purpose. The press 12 shown diagrammatically for purposes of illustration consists of a bed 13 having strain rods 14 threaded as at 15 at their lower ends into vertical holes 16 in the bed 13 and having reduced diameter upper end portions 17 which pass through corresponding vertical holes 18 in a press head 19 and are threaded to receive nuts 20 threaded thereon. Thus, the assembly of the base 13, head 19 and strain rods 14 constitutes a cage-like press framework, generally designated 21. Mounted for vertical reciprocation within the framework 21 is a press platen 22 having a compression surface 23 on the bottom thereof facing the compression surface 24 on the top of the press bed 13. The platen 22 is connected in any suitable way to a press plunger 25 which is in turn reciprocated in any suitable way, such as by a pressure fluid cylinder or by mechanical means such as toggle mechanism or cranks (not shown).

Figure 3:
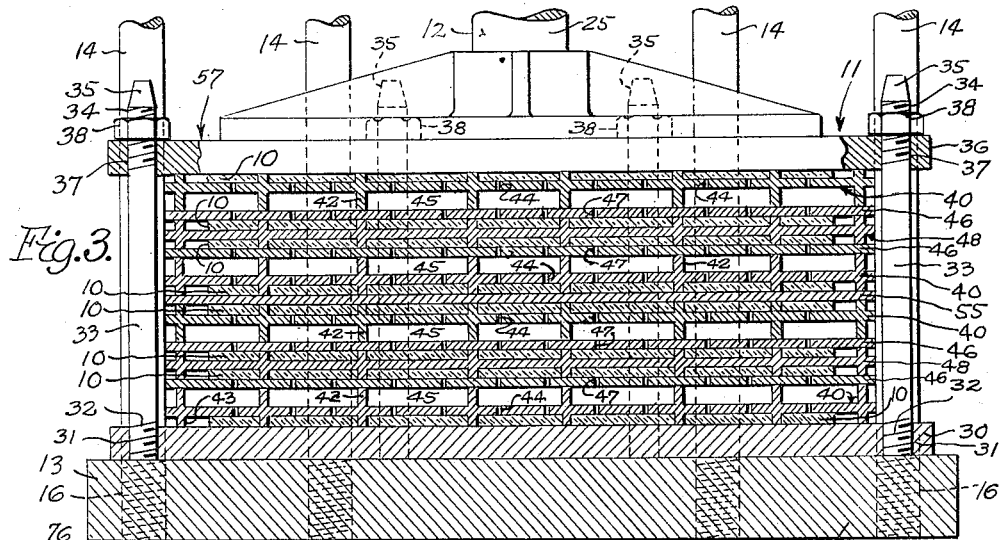
Figure 3 is a view similar to Figure 1, but showing the positions of the parts after the fibrous glass bats have been compressed and clamped in their holder prior to insertion in the furnace.

The clamping holder 11 consists of a base 30 which is provided with vertical threaded bores 31 at intervals around its periphery. Threaded into the bores 31 are the threaded lower ends 32 of clamping rods or studs 33, the upper end portions 34 of which are threaded and terminate in tapered or conical ends 35. Cooperating with and aligned with the foregoing clamping holder structure is a clamping plate 36 having vertical smooth-bored holes 37 disposed at intervals around its periphery and aligned with the holes 31 and rods or studs 33, and of a size sufficiently large to slide freely over the rods or studs 33, as shown in Figure 3. Nuts 38, not used during the initial portion of the compressing operation, are provided for threading onto the threaded end portions 34 of the clamping rods or studs 33 after compression has been completed (Figure 3).

Figure 2:
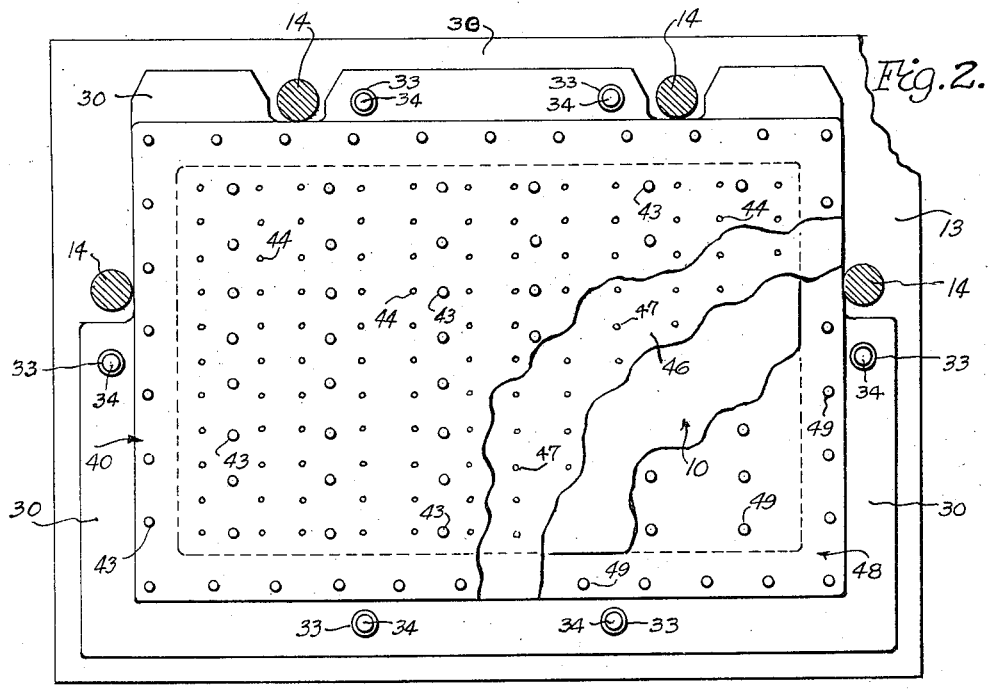
Figure 2 is a horizontal section taken along the line 2—2 in Figure 1, with portions at one corner thereof broken away in successive layers to disclose the substructure.

The fibrous glass bats or blankets 10 are stacked within the press 12 in a definite order and with different kinds of separators or spacers between them. The lowermost bat 10 rests upon the clamping holder base 30 and upon it is superimposed a perforated studded spacer plate 40 consisting of a plate 41 with a multiplicity of projections or feet 42 and 43 projecting in opposite directions from the opposite surfaces thereof and distributed at laterally-spaced intervals over the entire surface of the plate 41 (Figure 2). The plate 41 is also provided at intervals over its entire extent with multiple holes 44. The shorter feet or projections 43 rest upon the upper surface of the bat 10 and determine the thickness to which the bat 10 is compressed during the pressing operation. The feet 42, which are elongated in order to form heat or gas passageways 45, serve to support a plain perforated separator plate 46 having a multiplicity of spaced perforations 47 therethrough. The second fibrous glass bat 10 rests upon the separator plate 46 and, in turn, has superimposed upon it a studded imperforate separator plate 48 having upper and lower projections or feet 49 and 50 of equal lengths which, like the feet 43, are intended to form holes in the bats 10 and also to determine the eventual thickness to which the bat 10 is compressed. The third fibrous glass bat 10 rests upon the studded imperforate separator plate 48 and in turn has resting upon it another plain perforate plate 46 also having multiple spaced perforations 47 therethrough as before. Resting upon the separator plate 46 is another spacer plate 40 which is inverted, however, and has its long feet 42 resting upon the plate 46 and its short feet 43 projecting upward for the same purpose as the feet 43, 49 and 50 previously mentioned. Resting upon the inverted spacer plate 40 is the fourth and final bat 10 of the series and upon it rests a plain or imperforate plate 55.

The bat and separator or spacer series now repeats itself. The fifth fibrous glass bat 10 rests upon the plain imperforate plate 55 and in turn has resting upon it the studded perforated spacer plate 40 having the short feet 43 projecting downward and the long feet 42 projecting upward, as in the case of the spacer plate 40 resting on the lowermost bat 10. Resting upon the long feet 42 and separated from it by passageways 45 is another plain perforated separator plate 46, the same as the one of the same number previously mentioned. The sixth fibrous glass bat 10 rests upon the plate 46 and in turn has resting on it another imperforate separator plate 8 with short feet 49 and 50, the former temporarily supporting the seventh fibrous glass bat 10. Resting upon the latter is another plain perforated plate 46 upon which is superimposed another inverted separator plate 40 with the long feet 42 resting upon the plate 46 and the short feet 43 temporarily supporting the eighth fibrous glass bat 10. Resting upon the top of the eighth fibrous glass bat 10 is the clamping plate 36 and immediately above the latter is the compression surface 23 of the platen 22 of the press 12.

In the operation of the invention, and with the various elements arranged in the foregoing described manner shown in Figure 1, the press 12 is started in operation. Upon the application of power to the press plunger 25, whether mechanical or hydraulic power, the plunger 21 moves downward, carrying with it the clamping plate 36. As the clamping plate 36 moves downward, it compresses the topmost fibrous glass bat or blanket 10, forcing the latter downward against the uppermost spacer plate 40 and causing its upwardly-projecting short feet 43 to indent the bottom surface of the uppermost bat 10. The continued descent of the press platen 23 and clamping plate 36 causes this motion to be transmitted through the plates or separators 40, 46 and 55 to the fibrous glass bats 10, compressing all of them and causing the short feet 43, 49 and 50 of the various separator or spacer plates to indent the adjacent surfaces of the bats 10. These indentations subsequently form cutting guide points and, accordingly, are so distributed as to lie at certain predetermined positions which will subsequently guide the operator in cutting up the fibrous glass sheets into fibrous glass plates.

The operation of the press 12 is continued and the platen 22 caused to move downwardly until the holes 37 in the clamping plate 36 of the holder 11 pass downwardly over the upper ends 35 and threaded portions 34 of the clamping rods 33 into the relative positions shown approximately in Figure 3. When this stage is reached, the operator holds the platen 23 and clamping plate 36 in its aimed position (Figure 3) while he threads the clamping nuts 38 upon the threaded upper end portions 34 of the clamping rods 33. The operator then reverses the press 12 and causes the platen 22 on the plunger 25 to move upward out of contact with the clamping plate 36. The latter, however, is held in assembly with the base 30 and clamping rods 33 by the nuts 38, thereby maintaining the assembly in its clamped position within the holder 11.

Depending upon the extent of compression, a pressure of approximately 40 to 50 tons may be employed to compress the bats 10 from an original thickness of about 3 inches to a final thickness of approximately $7/32$ inch, or a reduction to about $1/14$ of its original thickness. Compression may be continued further, if desired, for example, down to $5/32$ inch or about $1/19$ the original thickness of the bat 10, but requiring the use of a greater pressing effort.

The operator now removes the compressed and clamped assembly 57 (Figure 3) from the press 12, turns it up on end so that the various separator or spacer plates 40, 46, 48 and 55 and the holder base 30 and clamping plate 11 lie in vertical positions. With the parts in these positions, the operator transfers the clamped assembly 57 to a suitable ventilated furnace and applies heat thereto. As the furnace becomes heated, it vaporizes the binder and coloring pigment, if any, on the glass fibers, the binder vapors escaping through the perforations 44 and 47 into the heat passageways 45 which, being now vertically-directed, serve as chimneys or flues for carrying away these vapors. Ventilation of the furnace to carry away these vapors is required until the temperature within the furnace reaches approximately 500° F. The furnace is then closed after all of the vapors have been driven off, and the heat continued to be raised up to about 1215 to 1240° F. for the period of approximately one hour. This comparatively slow application of heat enables the use of a low temperature for causing the glass fibers to become tacky and to coalesce than when it is attempted to carry out fusion in a very short period of time. The use of this lower temperature is less destructive of the various parts of the holder and plate assembly 57, keeping at a minimum the warping thereof and the surface scaling or oxidation which occurs heavily at the considerably higher temperatures used in prior processes.

The furnace is then permitted to cool so that the temperature of the assembly 57 drops to a point where it can be conveniently and comfortably handled, whereupon the operator removes the clamping nuts 38, lifts off the clamping plate 36 and disassembles the assembly 57, carefully removing the finished fibrous glass sheets, generally designated 60 (Figure 4). The sheets, when thus removed, are found to possess spaced indentations 61 located where the bats 10 had been penetrated by the various short feet 43, 49, 50 of the various separator or spacer plates 40 and 48. The operator then removes the sheet 60 to a band saw or other suitable cutting machine by means of which the sheet 60 is cut up into fibrous glass plates 62 (Figure 5) along the cutting lines 63, guided by the indentations 61.

The holder 11 may then be reinserted in the press 12 in the foregoing described manner and the cycle of operations repeated to produce another batch of fused compressed fibrous glass sheets 60.

Figures 6, 7:
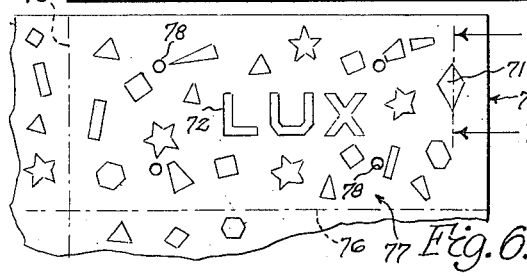
Figure 6 is a top plan view of a portion of a fused fibrous glass sheet according to a modification of the invention, wherein portions of the sheet are translucent.
Figure 7 is a fragmentary vertical section taken along the line 7—7 in Figure 6.

The modified fused compressed fibrous glass sheet, generally designated 70 (Figures 6 and 7), is produced in the manner previously described for the production of the sheets 60, except that pieces 71 of transparent or translucent glass of any desired shape are distributed at intervals over the tops of the fibrous glass bats 10 or, optionally, beneath the bottoms thereof. These glass pieces may, if desired, take the form of letters or numerals 72, for ornamental or advertising purposes. When compression, clamping and heating are carried out, as before, the glass pieces 71 are forced into the bats 10 so as to be flush with the surfaces thereof, forming indentations 73 containing the pieces 71. Since the pieces 71 transmit light more freely than the sheet 70 of fibrous glass, the portions 74 of the latter lying immediately behind the glass pieces 71 also transmit light more freely than the solid portions 75 surrounding them. Accordingly, the observer will be presented with a view of the sheet 70 consisting of brightly illuminated spots corresponding to the glass pieces 71 or letters or numerals 72, surrounded by darker or opaque portions through which light penetrates with more difficulty, or not at all. As before, the operator may cut the sheet 70 along cutting lines 76 to produce individual plates, generally designated 77. Indentations 78 are of course formed where the short feet 43, 49 and 50 engage the surface of the fibrous glass bat, as in the foregoing described procedure.

What I claim is:

1. A process of making a compressed porous fibrous glass sheet comprising superimposing a multiplicity of horizontally-disposed layers of fibrous glass material upon one another in a vertical stack in vertically-spaced relationship providing passageways between said layers, cold-pressing said stack of said layers into a multiplicity of compressed sheets while maintaining said sheets in said vertically-spaced relationship, each compressed sheet having a thickness which is less than one-tenth of the initial thickness of its respective layer, holding said sheets in said spaced relationship and under compressive stress without further compressing said sheets thereafter heating said stack of sheets while holding said sheets under said compressive stress to a temperature sufficient to render the glass fibers tacky and adherent to one another and also sufficient to remove the expansive resilience from said glass fibers, cooling said heated compressed sheets while continuing to hold said sheets under said compressive stress, and removing said sheets from said stack.

2. A process of making a compressed porous fibrous glass sheet comprising superimposing a multiplicity of horizontally-disposed layers of fibrous glass material upon one another in a vertical stack in vertically-spaced relationship providing passageways between said layers, cold-pressing said stack of said layers into a multiplicity of compressed sheets while maintaining said sheets in said vertically-spaced relationship, each compressed sheet having a thickness which is less than one-tenth of the initial thickness of its respective layer, repositioning said stack with said compressed sheets and the spaces therebetween disposed in vertical planes, holding said sheets in said spaced relationship and under compressive stress thereafter heating said stack of sheets while holding said sheets under said compressive stress to a temperature sufficient to render the glass fibers tacky and adherent to one another and also sufficient to remove the expansive resilience from said glass fibers, cooling said heated compressed sheets while continuing to hold said sheets under said compressive stress, and removing said sheets from said stack.

3. A process of making a compressed porous fibrous glass sheet comprising superimposing a multiplicity of horizontally-disposed layers of fibrous glass material upon one another in a vertical stack in vertically-spaced relationship providing passageways between said layers, cold-pressing said stack of said layers into a multiplicity of compressed sheets while maintaining said sheets in said vertically-spaced relationship, each compressed sheet having a thickness which is less than one-tenth of the initial thickness of its respective layer, repositioning said stack with said compressed sheets and the spaces therebetween disposed in vertical planes, holding said sheets in said spaced relationship and under compressive stress without further compressing said sheets thereafter heating said stack of sheets while holding said sheets under said compressive stress to a temperature sufficient to render the glass fibers tacky and adherent to one another and also sufficient to remove the expansive resilience from said glass fibers, cooling said heated compressed sheets while continuing to hold said sheets under said compressive stress, and removing said sheets from said stack.

References Cited in the file of this patent

UNITED STATES PATENTS

| | | |
|---|---|---|
| 625,464 | Phister | May 23, 1899 |
| 727,932 | Freeman | May 12, 1903 |
| 2,011,252 | Modigliani | Aug. 13, 1935 |
| 2,217,652 | Quick | Oct. 8, 1940 |
| 2,271,829 | Powers | Feb. 3, 1942 |
| 2,322,725 | Bovio | June 22, 1943 |
| 2,431,943 | Land et al. | Dec. 2, 1947 |
| 2,445,298 | Baker | July 13, 1948 |
| 2,526,815 | Glynn | Oct. 24, 1950 |
| 2,635,390 | Parker | Apr. 21, 1953 |

FOREIGN PATENTS

| | | |
|---|---|---|
| 15,303 | Great Britain | 1884 |